United States Patent [19]

Beckmann

[11] Patent Number: 4,541,480
[45] Date of Patent: Sep. 17, 1985

[54] HEAT EXCHANGER AND METHOD FOR JOINING PLATES THEREOF

[76] Inventor: Kenneth B. Beckmann, 5040 Enterprise Blvd., Toledo, Ohio 43612

[21] Appl. No.: 452,410

[22] Filed: Dec. 22, 1982

[51] Int. Cl.⁴ .................. B23K 31/02; B23P 15/26
[52] U.S. Cl. ........................... 165/79; 165/185; 228/203; 228/208; 228/183
[58] Field of Search ............ 228/203, 208, 183, 225, 228/226; 165/79, 133, 134 R, 185

[56] References Cited

U.S. PATENT DOCUMENTS

| | | | |
|---|---|---|---|
| 2,731,245 | 1/1956 | McChesney | 165/79 |
| 2,752,129 | 8/1956 | Modine | 165/79 X |
| 3,928,907 | 12/1975 | Chisholm | 29/527.4 |
| 4,247,037 | 1/1981 | Tami et al. | 228/203 |

FOREIGN PATENT DOCUMENTS 18607  5/1971  Japan ..................... 228/208

Primary Examiner—Kenneth J. Ramsey
Attorney, Agent, or Firm—Emch, Schaffer, Schaub & Porcello Co.

[57] ABSTRACT

An improved plate-type heat exchanger and a method for joining the plates thereof is disclosed. The heat exchanger includes a core containing a plurality of spaced parallel plates. The core is attached to the housing of the heat exchanger by means of a spray weld process and a standard weld process. In the spray weld process a filler metal is deposited on the core and the housing frame at the joint where the end portion of the plates and the housing frame meet. The filler metal used in the spray weld process forms a spray weld fillet which increases the thickness of the plates. The standard weld process further secures the plates to the heat exchanger housing frame.

13 Claims, 3 Drawing Figures

HEAT EXCHANGER AND METHOD FOR JOINING PLATES THEREOF

BACKGROUND OF THE INVENTION

The invention relates to a plate-type heat exchanger and a method for joining the plates to the heat exchanger housing. More specifically, an alloy is spray welded onto the plates and the housing frame. The plates are then welded to the housing frame by standard welding methods.

The concept of plate-type heat exchangers is well-known and is commonly used for achieving an indirect heat transfer between two circulating fluids which are at different temperatures. These heat exchangers generally consist of a core containing a plurality of spaced parallel plates welded or formed to define parallel passages. Manifolds are attached to the ends of the passages to direct each fluid to alternate passages so that each plate forms a heat conducting interface between the two fluids. Heat exchangers of this type are expensive to manufacture and present a risk of the two fluids mixing through leakage.

When metals are welded together much heat is generated. Both the arc created by the weld process and the filler metal used in the weld process radiate heat out into the surrounding plates and frame metals. The radiating heat causes considerable uneven expansion of the metals. As the filler metal is deposited on the plates and frame, the filler metal begins to cool and contract. Simultaneously, the heat of the arc weld process causes expansion immediately in front of this contraction. The temperatures of the plates and frame adjacent the weld rise, causing the metal of the plates and frame to expand. As the portion of the plates and frame adjacent the weld cool, the metal contracts. This uneven rate of expansion and contraction causes stress and distortion to the metals.

There is a greater problem when metals of different thicknesses are welded together. In a heat exchanger the plates must be sufficiently thin to allow effective transfer of heat across the surface of the plates; however, the metal frame members must be thick enough to support the weight of the core. The heat radiating from the deposit of the filler metal causes a greater stress on the thinner metal of the plates than on the thicker metal of the frame members. This stress is greatest in the area immediately adjacent the deposit of the filler metal. Often the stress is great enough to cause the thinner plate metal to crack allowing leakage of the two circulating fluids between the parallel passages.

The plates are not repaired easily if cracks develope in the thin plate metal.

Further, when the arc weld process is performed the arc drawn between the plates and frame, and the electrode causes the metals in the arc stream to melt. There is a depression created in the metals immediately in front of the deposited filler metal. The depth of the depression is dependent upon the rate of deposit of the filler metal. The rate of deposit of the filler metal affects the penetration of the arc into the metals. If the rate of deposit in the arc weld process is too slow or too fast there is a risk that the arc will completely penetrate the thinner metal of the plate and form a hole in the plate. In practice the weld heat neccessary to make a penetrating weld to the frame material will melt away the thin sheets and make welding them leak tight virtually impossible.

Thus, there is a need for a plate-type heat exchanger which is more economical to manufacture and which allows a more efficient transfer of heat. There is a further need for a method for joining the plates to the frame of the heat exchanger which eliminates the problem of distortion and cracks in the thin metal plates.

SUMMARY OF THE INVENTION

The present invention is directed to a plate-type heat exchanger and a method for welding the plates to the frame of the heat exchanger.

A core consisting of a plurality of parallel plates is positioned on the heat exchanger frame. The core substantially conforms to the shape of the frame. A filler metal is spray welded onto the base of the thin plates forming a spray weld fillet. This process effectively increases the thin plate thickness so that it may be welded without burning up or melting away. The plates are then secured to the frame by a normal welding process and the weld is located in the area of the plates where the material was deposited by spray welding.

It is the object of this invention to provide an improved method for welding plates to a heat exchanger. This method does allow a water tight weld to be made.

It is further object of this invention to provide an improved plate-type heat exchanger in which only a small area of the base of the plates is made thicker in order to withstand the heat of the standard welding process.

Other objects and advantages of the invention will become apparent as the invention is described hereinafter in detail and with reference to the accompanying drawings.

DESCRIPTION OF THE PREFERRED EMBODIMENT

Figure 1:
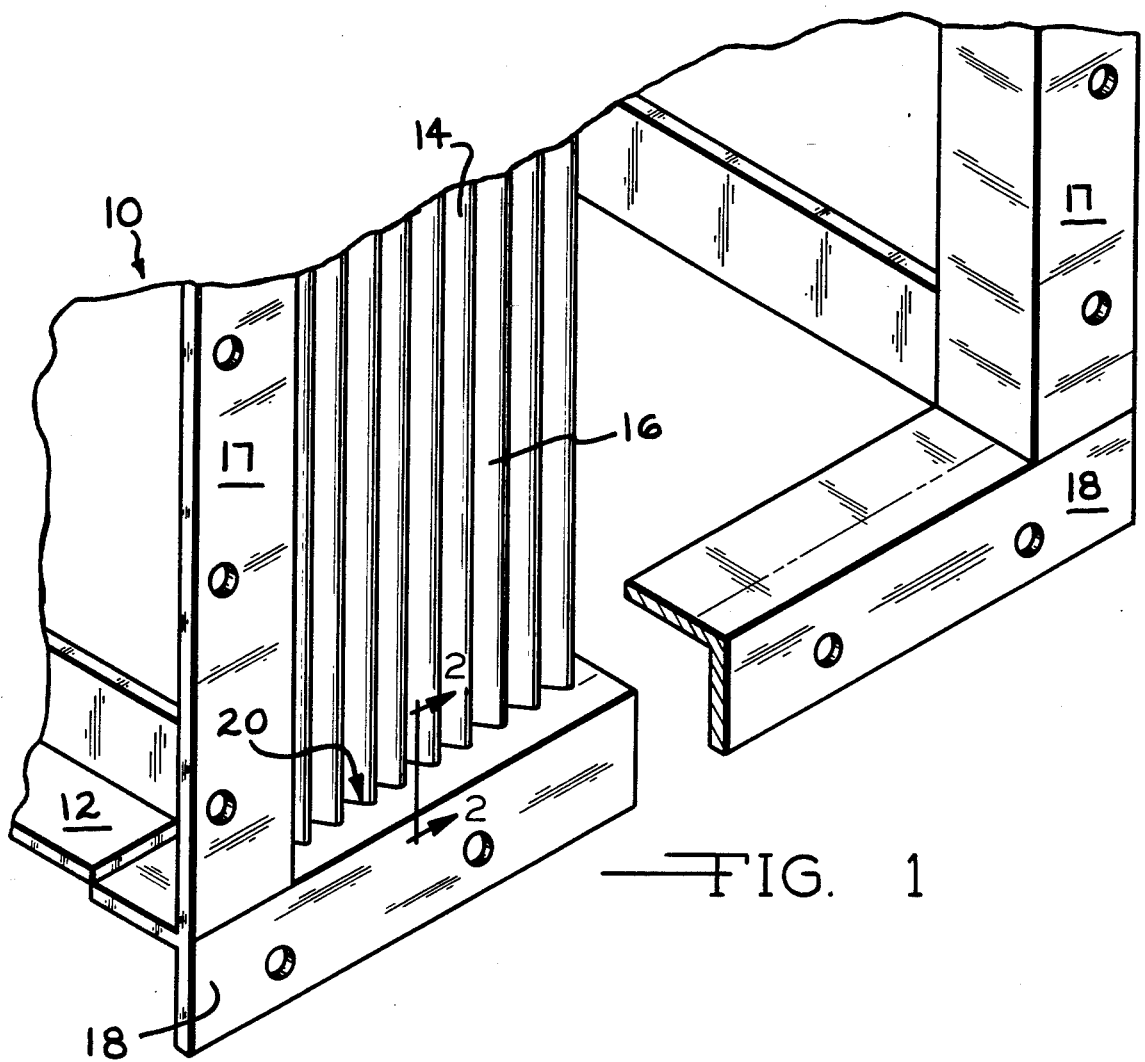
FIG. 1 is a fragmentary perspective view of a heat exchanger.
Figure 2:
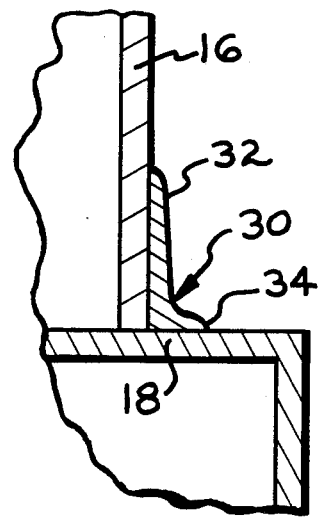
FIG. 2 is a fragmentary view taken along the line 2—2 in FIG. 1, according to the present invention, showing the concave fillet weld.

A fragmentary perspective view of a heat exchanger 10 is shown in FIG. 1. The heat exchanger 10 generally includes a metal housing 12, a core 14, a plurality of plates 16, and at least one manifold (not shown). The metal housing 12 generally consists of support frame members 17 and 18. The frame members 17 and 18 are generally made of relatively thick angle irons or other thick pieces of metal. The frame members 17 and 18 are thick enough to support the weight of the core 14.

The core 14 has of a plurality of spaced parallel plates 16 welded or formed to define parallel passages (not shown). At least one manifold (not shown) is attached to the ends (not shown) of the passages to direct the two circulating fluids (not shown) to alternate passages. The transfer of heat from one fluid to the other occurs as the fluids circulate in the passages. The shape of the core 14 substantially conforms to the shape of the housing 12. The core 14 is positioned in the housing 12 such that the edges of the plates 16 located at the ends of the core 14 rest on the frame member 18.

The plates 16 are made of relatively thin sheets of metal. Generally, the plates 16 are from about 0.010 to about 0.014 of an inch in thickness. The plates 16 must be sufficiently thin to allow heat to effectively transfer from one fluid to the other across the surface of the plates 16. The plates 16 of the core 14 extend vertically and form a substantially right angle, or tee joint 20, with the frame member 18. Normally, the core 14 is joined to the frame member 18 at the tee joint 20 by a standard welding method, such as a MIG weld (a metal inert-gas weld procedure).

It is essential in carrying out the present invention that the plates 16 and frame members 17 and 18 of the heat exchanger 10 be sealed to prevent the two circulating fluids from mixing through leakage. Thus, the heat exchanger 10 must be carefully constructed in order to provide a finished heat exchanger 10 with the desired characteristics of efficiency and economic practicality.

In order to produce such a desired heat exchanger the applicant has developed a method for sealing the plates 16 to the housing 12 of the heat exchanger 10 by spray weld build up of the plates 16 located at the end of the core 14. Then welding the core 14 to the frame member 18 with a standard welding procedure.

A filler metal, such as a stainless steel nickel alloy, is spray welded to the exterior base of the edges of the plates 16. In spray welding the filler metal is heated and converted to liquid form. The liquid filler material is then spray deposited onto the surface of the piece to be spray welded. In this manner the metal filler is deposited as a layer on the desired surface. The spray welded metal filler increases the thickness of the metal present along the base of the plates 16 and significantly increases the strength of the plates in the area of the base without requiring the entire plate to be made from a thicker metal which would reduce the cost efficiency of the plates. The filler metal has heat expansion and contraction characteristics that are complementary with the characteristics of both the plates 16 and the frame member 18. As the filler metal is deposited on the tee joint 20 it forms a spray weld fillet 30. The spray weld fillet 30 extends continuously along the tee joint 20. The filler metal is spray welded onto the tee joint 20 such that a leg 32 of the spray weld fillet 30 extends up the exterior base of the plates 16 from about 0.25 of an inch to about 1 inch.

In practice it has been found that a leg 32 of the spray weld 30 that is approximately 0.75 of an inch in length works particularly well. The spray weld fillet also has a base 34 that extends along the frame member 18. The height of the leg 32 enables the heat produced by the spray weld process to radiate more evenly through the plates 16. The leg 32 of the spray weld fillet 30 has an average thickness from about ½ to about 10 times the thickness of the plates 16. In practice, it has been found that a thickness for the leg 32 that is substantially the same as the thickness of the plates 16 works particularly well. Of course, the base 34 of the spray weld fillet 30 is generally thicker than the leg 32 as the base extends along frame member 18.

The deposit of the spray weld fillet weld 30 by the spray weld process is performed at a rapid rate and at temperatures lower than normal arc welding. The heat created by the deposit of the filler metal is diffused along the spray weld fillet 30 at the base of the plates 16 and the frame members 17 and 18. Because of the lower temperature and diffusion of the heat the risk of damage to the plates 16 from rapid expansion and contraction during the spray weld process is greatly reduced.

Figure 3:
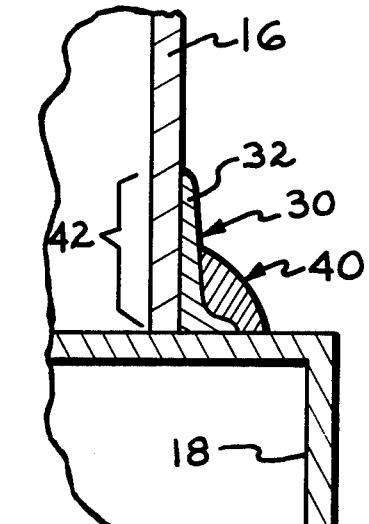
FIG. 3 is a fragmentary view taken along the line 2—2 in FIG. 1, according to the present invention, showing the concave fillet weld and the convex fillet weld.

After the spray weld fillet 30 is deposited on the tee joint 20 the plates 16 and frame member 18 are joined by a standard MIG weld process. A standard MIG weld process is performed to give strength and stability to the welded tee joint 20. During the MIG weld process a second filler metal is deposited over the spray weld fillet 30. The second filler metal forms a convex fillet weld 40 which extends continuously along the tee joint 20. The convex fillet weld 40 is bonded to the spray weld fillet 30, as shown in FIG. 3. The leg 32 of the spray weld fillet 30 on the tee joint 20 creates a buffer zone 42 for the MIG weld. The thickness and the height of the leg 32 allow the heat from the MIG weld process to radiate through the leg 32 to the plates 16 more uniformly. The smaller difference between the thickness of the plates 16 and the thickness of the frame members 17 and 18 allows the MIG weld process to be used with less risk of heat damage to the plates 16. The buffer zone 42 slows the rate of expansion and contraction of the plates 16, thus lessening the risk of stress damage or cracking of the plates 16. The spray weld fillet also substantially increases the thickness of the plates 16 in the area where the MIG weld is deposited to complete the bonding of the plates 16 to frame member 18. The increased thickness in the area where the MIG weld is to be formed improves the ability of the plates to handle the high heat generated during MIG welding and reduces the chance of the welding arc making a hole in or deforming the plates.

The above-detailed description of the invention is given only for the sake of explanation. Various modifications and substitutions other than those cited, can be made without departing from the scope of the invention as defined in the following claims.

What I claim is:

1. A method for joining plates of a heat exchanger to a support member comprising:
    engaging each of said plates with said support member to form a joint therebetween,
    depositing a material on each of said joints, said material flowing onto the portion of said plates adjacent said joint to form a first leg on each of said plates which extends up the exterior of said plates, said material also flowing onto said support member to form a base, said material adhering to said plates and support member and increasing the thickness and strength of said portion of said plates adjacent said joint,
    welding said plates to said support member, said weld primarily contacting said first leg of said material and substantially avoiding contact with said plates, said weld also contacting both said base of said material and said support member to secure said plates to said support member.

2. The method of claim 1 in which said first leg of said material is deposited on said plates in a thickness from about ½ to about 10 times the thickness of said plates.

3. The method of claim 1 in which said first leg of said material extends from about 0.25 of an inch to about 1 inch up the side plates from said support members.

4. The method of claim 1 in which said material is deposited by means of spray welding.

5. The method of claim 1 in which said material is a stainless steel nickel alloy material.

6. The method of claim 1 in which said plates are welded to said support member by a metal-inert gas welding means.

7. The method of claim 1 in which said plates extend from said support member in a direction that is substantially perpendicular to said support member.

8. A method for joining plates of a heat exchanger to a support member comprising:
   positioning said plates on said support member,
   depositing a material on said support member and a portion of said plates that is adjacent said support member by spray welding said material, said material adhering to said support member and to said plates, said material on said portion of said plates having a thickness from about ½ to about 10 times the thickness of said plates and said material extending from about 0.25 of an inch to about 1 inch up said plates from said support member; and
   welding said plates to said support member to secure said plates to said support member, said weld being a metal-inert gas weld, said weld being formed on said support member and said portion of said plates where said spray weld material has been deposited whereby said increased thickness of said portion increases the strength of said plates in the area of said metal-inert gas weld.

9. A plate type heat exchanger comprising:
   a support member, said support member having a support surface; and
   a plurality of plates positioned on said support surface, said plates extending substantially perpendicular from said support surface, a layer of material deposited on said support surface and on a portion of said plates that is adjacent said support surface, said material defining a first leg on said portion of said plates and a base on said support surface, said material increasing the thickness of said portion of said plates, said plates being welded to said support member to connect said plates to said support member, said weld being located on said base and said support surface of said support member and on said first leg on said portion of said plates where said plates have increase thickness to provide a stronger more temperature resistant area of said plates for said weld.

10. The heat exchanger of claim 9 wherein said material is deposited on said support surface and said portion of said plates by means of spray welding.

11. The heat exchanger of claim 9 wherein said first leg of said material deposited on said portion of said plates has a thickness from about ½ to about twice the thickness of said plates.

12. The heat exchanger of claim 9 wherein said first leg of said material deposited on said portion of said plates extend from about 0.25 of an inch to about 1 inch up the plates from said support member.

13. The heat exchanger of claim 9 wherein said web to join said plates to said support member is a metal-inert gas weld.

* * * * *